United States Patent Office 2,791,801
Patented May 14, 1957

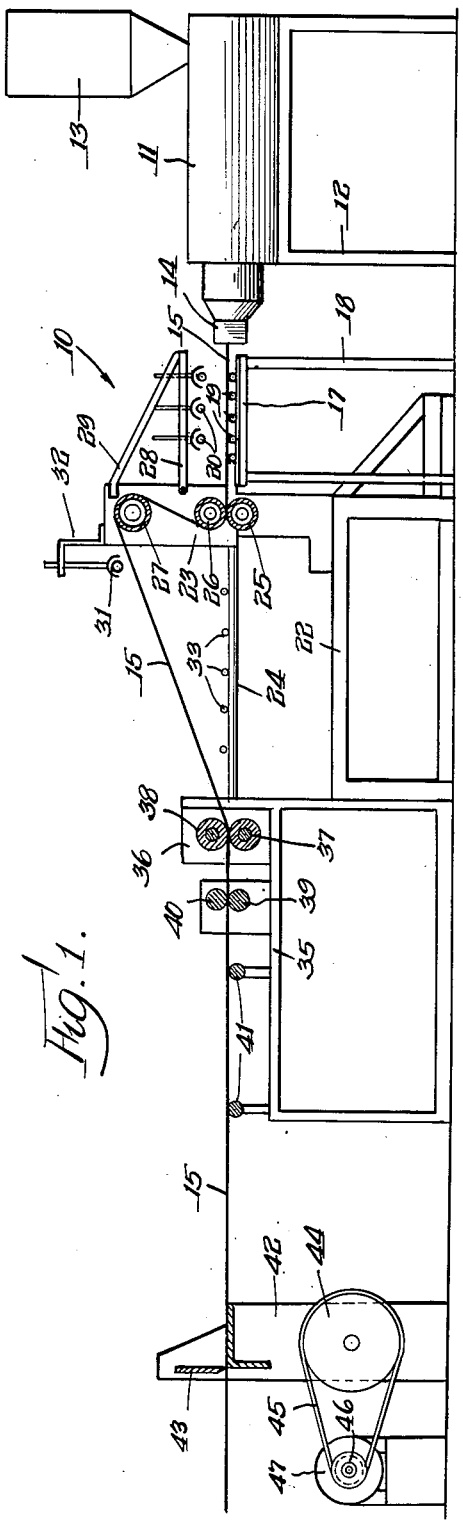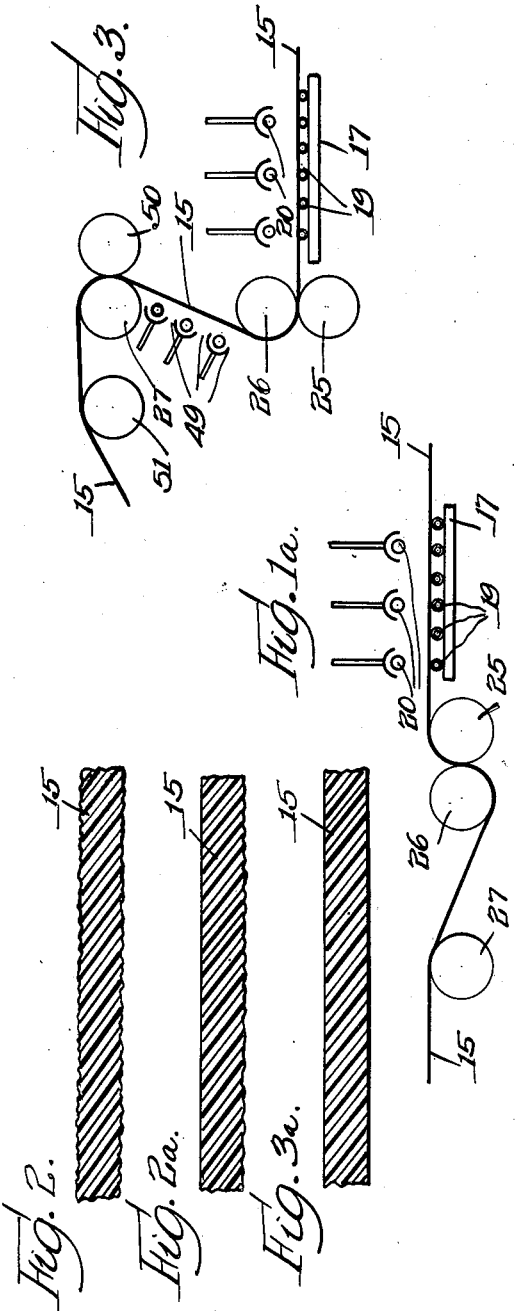

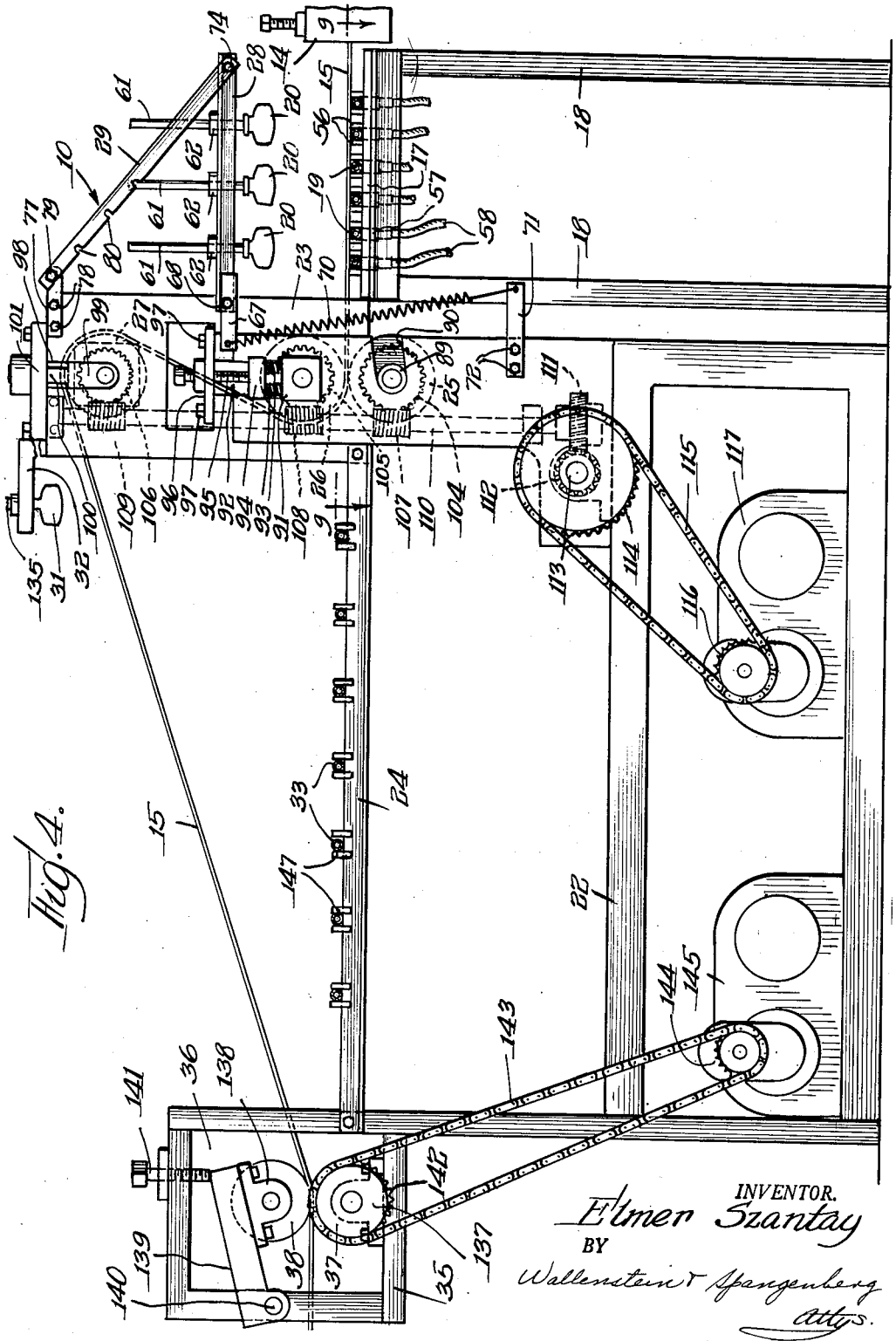

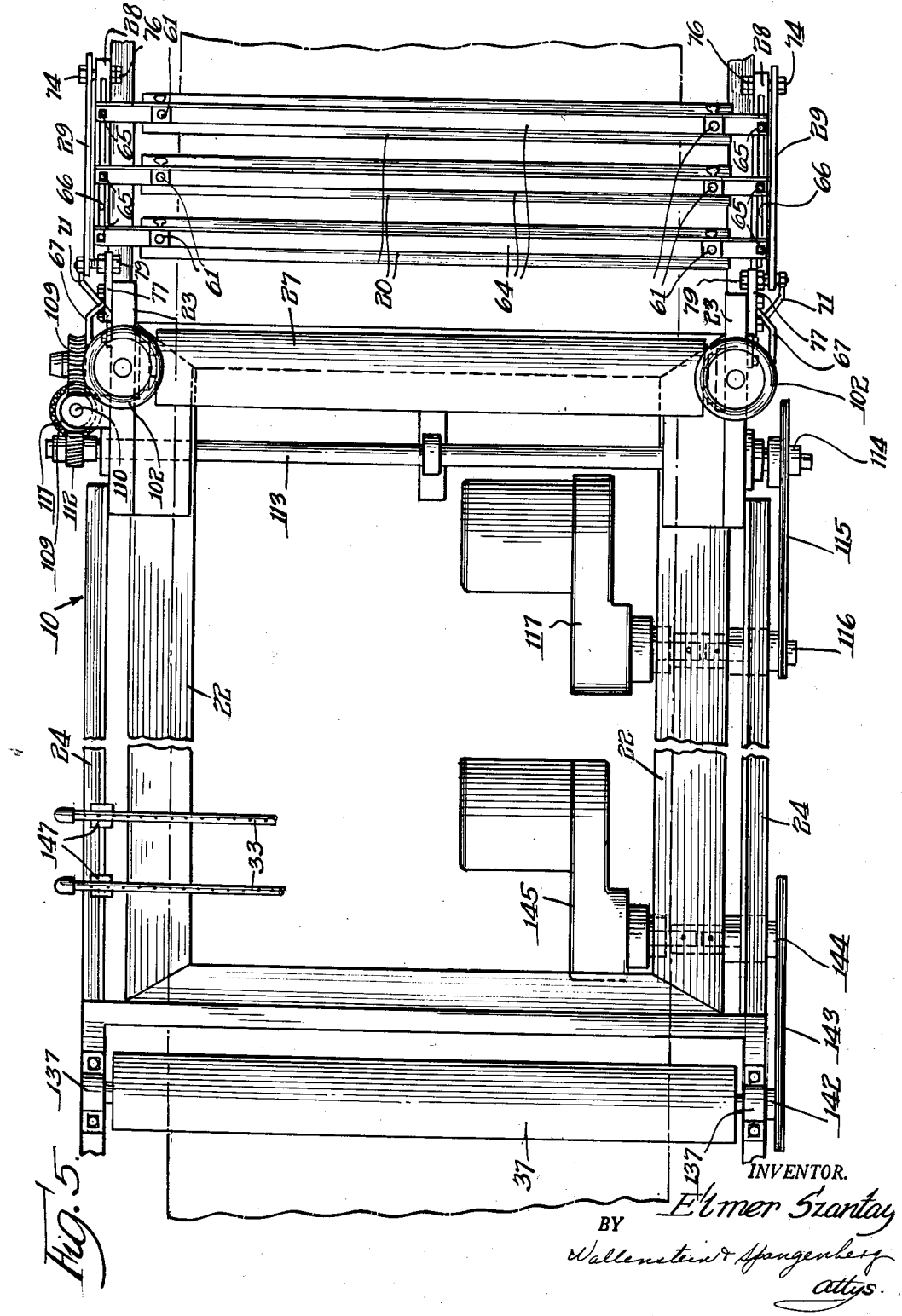

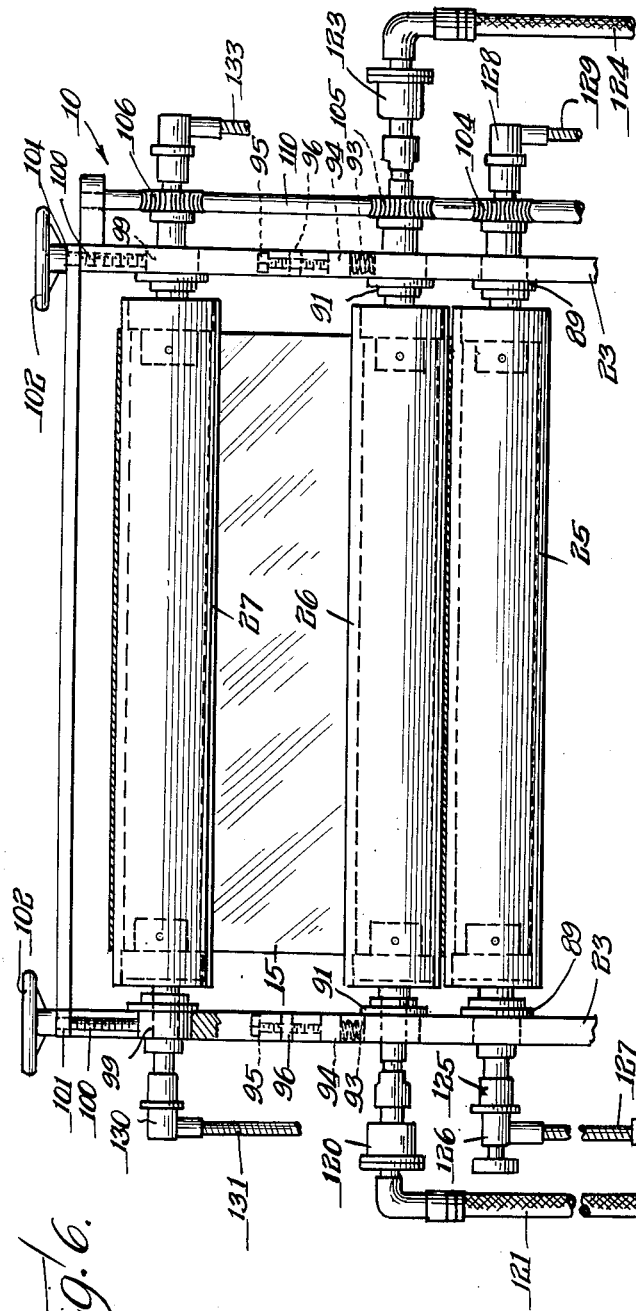
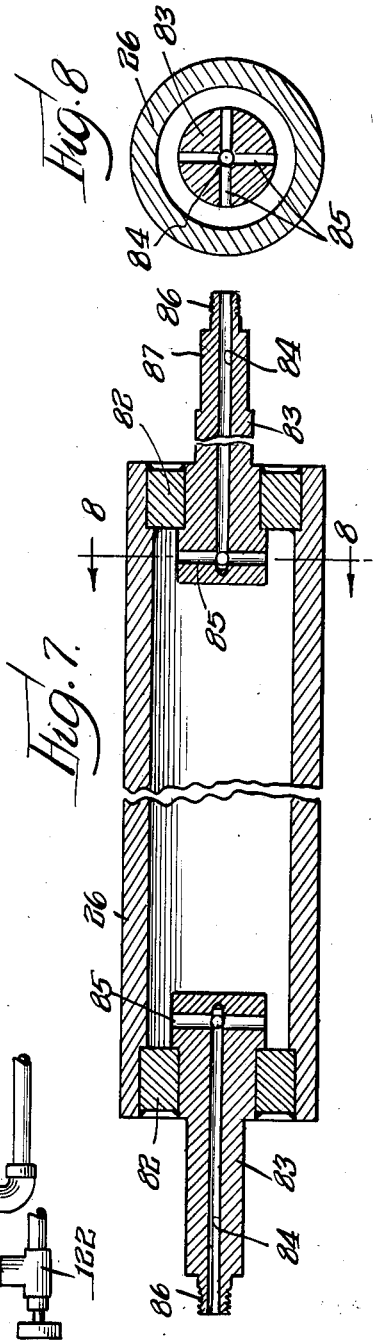
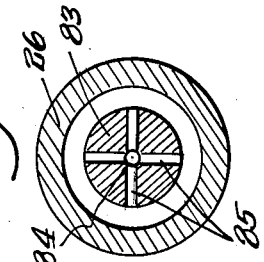

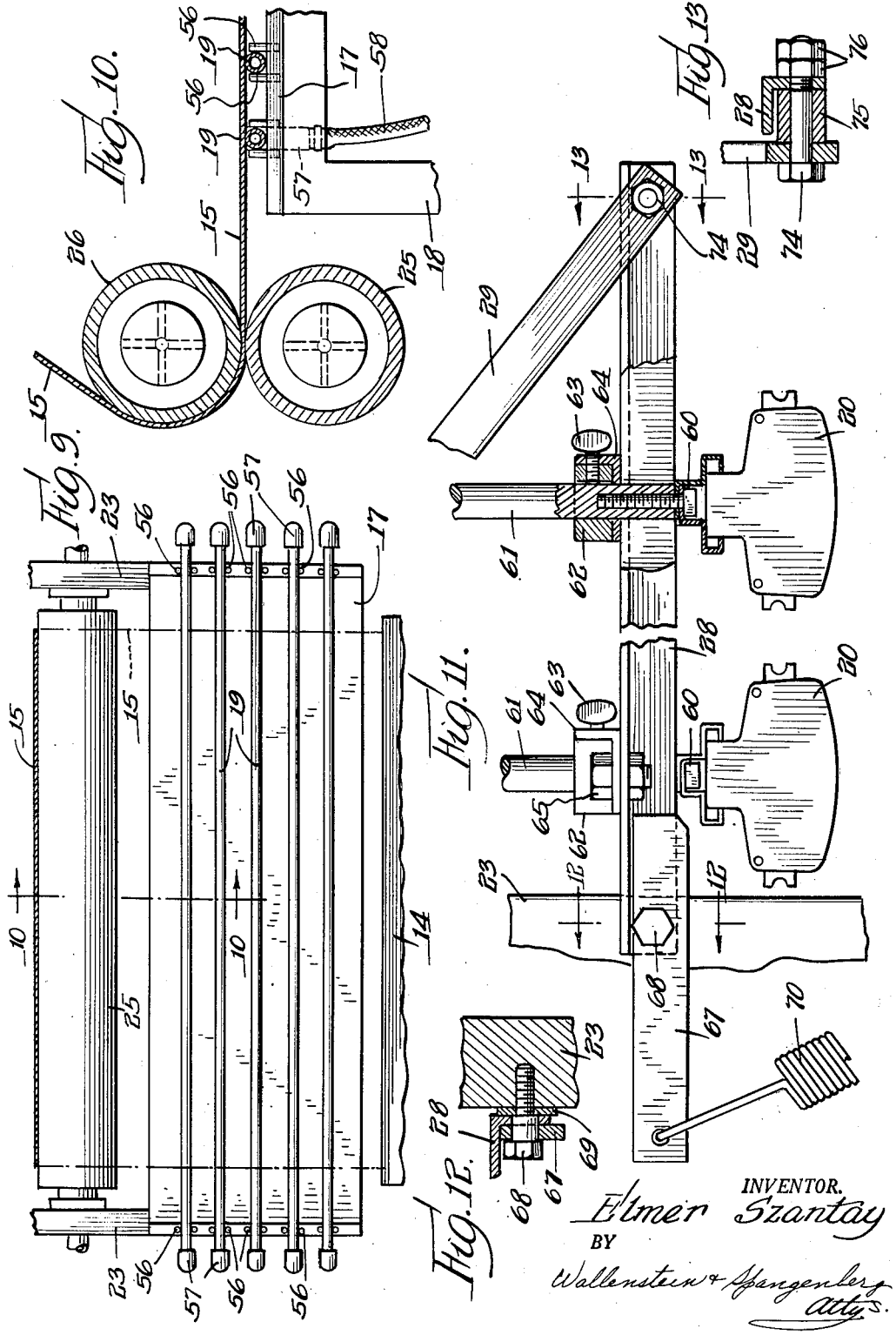

2,791,801

METHOD AND APPARATUS FOR CONTINUOUSLY PRODUCING THERMOPLASTIC ORGANIC SYNTHETIC PLASTIC SHEETS HAVING POLISHED SURFACES

Elmer Szantay, Chicago, Ill.

Application December 9, 1953, Serial No. 397,084

18 Claims. (Cl. 18—4)

Generally, when thermoplastic organic synthetic plastic sheets are produced, by extrusion molding or other continuous processes, such sheets do not have polished surfaces, the surfaces being somewhat rough and having a decided grain of peaks and valleys. A number of attempts have been made in the past to provide such sheets with polished surfaces, but these attempts have not been commercially successful. For example, in one such attempt, sections of the sheets have been placed against metal plates having polished surfaces, placed in a press and then heated and cooled in the press for polishing the sheet sections. While the polishing process, so performed, gives good results, it is a batch process which is so expensive as to be commercially prohibitive. In another attempt, one directed to a continuous process, the sheet has been applied against a polished traveling belt, the belt and sheet being successively heated and cooled for polishing purposes. This process, however, is wasteful of heat, requires the use of a completely formed sheet and the polishing of the sheet has not been consistently and commercially uniform.

The principal object of this invention is to provide a new and improved method and apparatus for continuously producing thermoplastic organic synthetic plastic sheets having polished surfaces, wherein a high degree of polish is obtained, wherein the polishing of the sheet is consistently and commercially uniform, wherein the polishing is accomplished in an inexpensive and continuous manner, wherein greatest heat economies are made possible, wherein the method is simple and readily performed on a commercial basis, wherein the apparatus is simple and inexpensive in construction and is readily manipulated for performing the process, and wherein the polishing of the sheet may be accomplished in the same continuous process with the extrusion molding of the sheet.

While in accordance with this invention, the sheet of thermoplastic organic synthetic plastic may be polished after the sheet has been completely produced, it may in accordance with this invention be polished during the production thereof, and the invention will be described hereafter in connection with the latter.

Briefly, an extrusion machine mixes and plasticizes a thermoplastic organic synthetic thermoplastic material of any desired kind and continuously extrusion molds the same through a suitable extrusion die as a continuously advancing soft sheet. A cooling mechanism is located adjacent the extrusion die for cooling one of the surfaces of the soft sheet, preferably, the lower side thereof. In this respect, the soft sheet passes over the cooling mechanism for cooling that surface of the sheet sufficiently to cause the same to be self supporting and form retaining so as to act as a conveyor for the sheet. This cooling mechanism may include a heat conducting plate and heat conducting pipes through which a cooling medium is circulated. In addition to contacting the sheet the cooling mechanism also provides a cold blanket of air for uniformly cooling the lower side of the sheet.

A heating mechanism is located adjacent the extrusion die for heating the other surface, the upper surface, of the soft sheet. In this respect the soft sheet passes under the heating mechanism for heating that surface of the sheet sufficiently to soften the same to a plastic flow state or moldable condition. This heating mechanism may include radiant heating means directed at that surface of the sheet to soften that surface.

The thermoplastic organic synthetic plastic sheet is a good insulator against heat transfer and allows this differential in temperature between the sheet surfaces to be maintained which in turn permits, at the same time, the lower surface to be sufficiently cool to act as a conveyor and the upper surface to be sufficiently hot to be soft and moldable. This regulation of the surface temperatures in this manner is accomplished with a minimum heat transfer and expenditure of heating and cooling energy.

A pair of cylindrical rolls are located adjacent the heating and cooling means and preferably these rolls are horizontally arranged, such as in a vertical or a horizontal stack. The roll, which is to be contacted by the soft surface of the sheet, is provided with a polished surface. Located adjacent the roll with the polished surface, preferably in stacked alignment with the rolls, is a cylindrical stripper roll. The sheet is passed from between the heating and cooling mechanisms between said pair of rolls, over a portion of the roll having the polished surface and then over the stripper roll. The sheet is pressed between said pair of rolls and in so doing is sized as to thickness, and is densified and compressed into a more homogeneous sheet. The soft upper surface of the sheet which engages an appreciable portion of the polished roll is molded and polished by that roll. This polished roll also cools the soft surface of the sheet being molded thereby sufficiently to set the polished surface and permit the sheet to be stripped therefrom by the stripper roll. In this respect, the polished roll is preferably cooled in any suitable manner as by circulating a cooling medium therethrough. The other of the pair of rolls also may perform a cooling operation on the sheet to regulate the rate of cooling of the sheet, and here also a cooling medium may be circulated through this roll. Since it is sheet surface temperature that is principally being regulated by said pair of rolls only a minimum of heat transfer and expenditure of cooling energy is here required, although large changes in surface temperatures are produced.

At a distance from the stripper roll are located a pair of pulling rolls, the polished sheet extending from the stripper roll between the pulling rolls to be pulled thereby. By the time the polished sheet reaches the pulling rolls, it has cooled considerably and is substantially completely set. The pulling rolls, said pair of rolls and the stripper roll are all driven at substantially the same linear speed as the sheet is being extruded by the extrusion die so as to maintain a desired degree of tension in the sheet between the extrusion die and the pulling rolls. Edge shears or routers may be provided adjacent the pulling rolls for trimming the edges of the sheet to uniform widths. Cut-off means may be provided at the downstream end of the apparatus for severing desired sections from the end of the advancing sheet.

In accordance with this invention, the other side of the sheet may also be polished, if desired, to provide a sheet with both of its sides polished. In this respect, the stripper roll may be provided with a polished surface, another roll arranged adjacent thereto and heating means provided for heating the unpolished side of the sheet to a soft moldable condition as the sheet passes to the stripper roll. The sheet in passing between these two rolls has its other side polished in the manner discussed above. Preferably an additional stripper roll is provided for stripping the sheet from the polished stripper roll. Since only the surface of the sheet is heated to a soft moldable condition, the polished surface previously applied to the other side of the sheet will not be adversely affected by this second polishing operation.

Basically, as seen from above, this invention involves the regulation of surface temperatures of the thermoplastic organic synthetic plastic sheet, making one surface self supporting and self retaining so that it acts as a conveyor for the sheet for readily handling the same and for providing a hard backing against which pressure can be applied through the soft moldable surface to obtain the desired high polished finish thereon, making the other surface soft and moldable so that it may be molded and polished in a continuous manner by a polished roll, and reducing the surface temperature of the sheet on the polished roll to set the polished surface and allow stripping of the sheet from the polished roll. This invention may, therefore, be utilized for continuously polishing sheets which have already been completely formed or for continuously polishing sheets as they are being formed.

Further objects of this invention reside in the various steps and sequence of steps utilized in the method of this invention for producing thermoplastic organic synthetic plastic sheets with polished surfaces and in the details of construction and cooperative relationships between the component parts of the apparatus of this invention for performing the method.

Other objects and advantages of this invention will become apparent to those skilled in the art upon reference to the accompanying specification, claims and drawings, in which:

Fig. 1 is an illustrative view, generally in the form of a flow diagram, illustrating the method and apparatus of this invention for continuously producing thermoplastic organic synthetic plastic sheets having polished surfaces:

Fig. 1-A is a partial illustration similar to Fig. 1 but showing the horizontal rolls arranged in a horizontal stack rather than a vertical stack;

Fig. 2 is an enlarged sectional view through a portion of a thermoplastic organic synthetic plastic sheet which has been extrusion molded;

Fig. 2-A is a view similar to Fig. 2 but illustrating one side of the sheet being polished in accordance with this invention;

Fig. 3 is a partial illustration similar to Fig. 1 but showing the manner in which the other side of the thermoplastic organic synthetic plastic sheet may also be polished;

Fig. 3-A is a view similar to Figs. 2 and 2-A but illustrating the sheet polished on both sides;

Fig. 4 is a side elevational view of the portion of the apparatus utilized in polishing the sheet;

Fig. 5 is a top plan view of the portion of the apparatus illustrated in Fig. 4;

Fig. 6 is an end elevational view of the apparatus looking from the right in Figs. 4 and 5;

Fig. 7 is a vertical sectional view through the roll having polished surface;

Fig. 8 is a sectional view taken substantially along the line 8—8 of Fig. 7;

Fig. 9 is a horizontal plan view taken substantially along the line 9—9 of Fig. 4;

Fig. 10 is an enlarged sectional view taken substantially along the line 10—10 of Fig. 9;

Fig. 11 is a side elevational view of the radiant heating means with portions thereof broken away;

Fig. 12 is a vertical sectional view taken substantially along the line 12—12 of Fig. 11;

Fig. 13 is a vertical sectional view taken substantially along the line 13—13 of Fig. 11.

Referring now to the drawings and more particularly to Fig. 1, the apparatus of this invention for continuously producing thermoplastic organic synthetic plastic sheets having polished surfaces is generally designated at 10. It includes a conventional extrusion machine 11 carried by a suitable base 12. The extrusion machine 11 is provided at one end with a hopper 13 into which thermoplastic organic synthetic plastic material, in granular or like form, is fed. This material is heated and worked in the extrusion machine to plasticize the same. The other end of the extrusion machine is provided with a heated extrusion die 14 having a long, substantially horizontally arranged adjustable slot through which the plastic material is extruded in the form of a soft sheet indicated at 15. This sheet 15, when it is so extruded, is very soft and is not self supporting and form retaining.

Located adjacent to the extrusion die 14, is a cooling mechanism including a heat conducting plate 17 made of brass or similar material. This plate may be supported by a suitable frame 18. Resting on the plate 17 are a plurality of transversally arranged heat conducting tubes 19, such as brass tubes. Cold water is circulated through these tubes to cool the tubes and the plate. The soft sheet 15 of extruded thermoplastic organic synthetic plastic is advanced over this cooling mechanism and the lower surface of the advancing soft sheet is cooled thereby sufficiently to cause the same to be self supporting and form retaining so that this lower surface acts as a conveyor for the sheet 15.

Also located adjacent the extrusion die 14 is a heating mechanism which includes one or more radiant heating devices 20, such as commercially available Calrod units. These radiant heating devices include electrical heating elements and reflectors for directing radiant heat downwardly onto the upper surface of the advancing sheet 15. The radiant heating devices 20 heat this upper surface of the sheet sufficiently to soften the same to a plastic flow state or moldable condition. The thermoplastic organic synthetic plastic sheet 15 is a good insulator against heat transfer and it allows this differential in temperature between the sheet surfaces to be maintained which in turn permits, at the same time, the lower surface to be sufficiently cool to act as a conveyor and the upper surface to be sufficiently hot to be moldable.

Located adjacent the heating and cooling mechanisms is a frame 22 which has a pair of spaced apart uprights 23 and a pair of supporting members 24. A pair of horizontally arranged and vertically stacked cylindrical rolls 25 and 26 are journalled for rotation between the pair of uprights 23. Also journalled between the uprights 23, above the roll 26, is a cylindrical stripper roll 27. These rolls 25, 26 and 27 are preferably hollow so that a cooling medium may be circulated therethrough. The roll 26 is provided with a highly polished surface. The radiant heating devices of the heating mechanism are adjustably supported by a pair of members 28 which in turn are carried at one end by a pair of arms 29, the radiant heating devices being supported above the advancing sheet 15.

The advancing sheet 15, after leaving the cooling and heating mechanisms, passes between the pair of rolls 25 and 26 to be pressed thereby for the purpose of sizing the sheet as to thickness. The advancing sheet 15 passes around the roll 26 having the polished surface and engages an appreciable portion thereof. The advancing sheet 15 then passes over the stripper roll 27. Since the hot upper surface of the advancing sheet 15 engages the polished surface of the roll 26 it is molded thereby into a polished condition. As the upper surface of the advancing sheet 15 so engages the polished surface of the roll 26 it is cooled thereby sufficiently to cause the polished surface to set and to allow stripping of the sheet from the roll 26 by the stripper roll 27. Preferably, a relatively cold cooling medium is circulated through the roll 26 to accomplish this cooling operation. Also, preferably a warmer cooling medium is circulated through the roll 25 for regulating the rate of cooling of the lower surface of the advancing sheet 15. The stripper roll 27 may or may not have a cooling medium circulated therethrough, depending upon the amount of cooling to be accomplished thereby.

A radiant heating means 31, similar to the radiant heating means 20, is adjustably carried by a bracket 32 above the advancing sheet 15 as it emerges from the stripping roll 27. This radiant heating device 31 is for the purpose of annealing the advancing sheet 15 to remove stresses and strains therefrom. If desired, the supporting member 24 may carry a plurality of pipes 33 having upwardly facing holes. Air may be supplied to these pipes to be directed against the under-side of the sheet 15 for cooling the same.

A frame 35 which may or may not be a part of the frame 22 carries a pair of spaced uprights 36 in which are journalled for rotation a pair of pulling rolls 37 and 38. The advancing sheet 15 passes between the pulling rolls 37 and 38 and is pulled thereby. The frame 35 may also be provided with edge trimming devices such as routers or rotary shears 39 and 40. These edge trimming devices trim the edges of the sheet 15 to provide a uniform width for the sheet. The sheet 15 may be supported by a supporting device 41 and may be advanced to a shearing machine 42 having a shearing knife 43 for cutting desired sections from the end of the advancing sheet 15. The shearing machine 42 may be driven by a pulley 44, belt 45 and pulley 46 driven by an electric motor 47.

The pair of rolls 25 and 26, the stripper roll 27 and the pulling rolls 37 and 38 are power driven at substantially the same linear speed as the rate of linear extrusion of the sheet 15 from the extrusion die 14 in order to maintain predetermined desired tension in the advancing sheet.

When the sheet 15 is extruded from the extrusion die 14 the surfaces of the sheet are not polished, they being somewhat rough and including a grain of peaks and valleys as illustrated in Fig. 2. However, in accordance with this invention the upper surface of the sheet 15 is surface molded by the polished roll 26 to eliminate the peaks and valleys to provide an extremely smooth surface as illustrated in Fig. 2-A. The degree of polish imparted to the surface of the sheet 15 depends upon the type of material forming the sheet, the surface temperatures of the sheet and the degree of polish on the roll 26.

The method and apparatus of this invention is adapted to produce polished surfaces on thermoplastic organic synthetic sheets of substantially all types of such materials, such as, cellulose ethers such as methyl cellulose and ethyl cellulose; cellulose esters such as cellulose acetate, cellulose butyrate and cellulose acetate-butyrate; acrylate and methacrylate polymers and copolymers such as those derived from methyl acrylate and methyl methacrylate with or without vinyl acetate, vinyl alcohol, acrylonitrile, and the like; polystyrene polymers and copolymers; polyvinyl resins such as polyvinyl chloride, polyvinyl acetal, polyvinyl acetate, polyvinyl chloride-acetate, polyvinylidene chloride, polyvinyl butyral, polyvinyl alcohol, and copolymers of vinyltoluene. For purposes of specific illustration in this application, a modified polystyrene plastic, commercially known as Dow 475, a polystyrene plastic modified with rubber, is herein described as being produced into a sheet form with a polished surface in accordance with this invention. The sheet so produced may have an extrusion thickness of .080" and may have a width of 50" plus. The average conditions for forming and polishing a sheet of this material are substantially as follows: The machine heats of the extrusion machine 11 consist of five (5) zones, the rear zone at the hopper feed opening being substantially 250° F. The average condition for the production of this thickness of sheet in the four (4) forward zones is substantially 360° F. The range of temperatures in the rear zone may be from 200° F. to 300° F. and the range of temperatures for the four (4) forward zone may be from 330° F. to 440° F. The long extrusion die 14 for extruding the sheet 15 is temperature controlled in various zones along its length, the average die temperature being substantially 400° F. The range of die temperatures may extend from 340° F. to 420° F. The actual temperature of the plastic material emerging from the extrusion die 11 is substantially 400° F. and the normal range of temperatures of the material may extend from 340° F. to 410° F.

The plate 17 and the pipes 19 of the cooling mechanism are cooled by circulating cold water through the pipes. The average temperature of the water circulated through the pipes is substantially 65° F. and the range of water temperatures may extend from 40° F. to 80° F. This cooling, afforded by the cooling mechanism, lowers the temperature of the lower surface of the advancing sheet substantially to cause the same to be self-supporting and self retaining so as to act as a conveyor for the sheet. The average surface temperature of the bottom roll 25 is substantially 195° F. and this roll is preferably cooled by circulating hot oil therethrough. The range of surface temperature of the roll 25 may extend from 175° F. to 215° F. Here the imput temperature of the hot oil to the roll is substantially 160° F. and the exit temperature from the roll is substantially 180° F. The range of oil imput temperatures may extend from 140° F. to 190° F. and the range of exit oil temperatures may extend from 150° F. to 210° F. This roll 25 therefore provides additional controlled cooling of the lower surface of the advancing sheet 15.

The heating mechanism, including the radiant heaters 20, operates to heat the upper surface of the advancing sheet 15 to a high temperature of at least the temperature of the material being extruded from the die 14, namely, to at least substantially 400° F. This makes the upper surface of the advancing sheet 15 soft and moldable; a plastic flow state, for the subsequent polishing operation. The average surface temperature of the roll 26 having the polished surface is 115° F. This roll is preferably cooled by water, the average imput temperature of the water being 70° F. and the average exit temperature of the water being substantially 75° F. The range of water temperatures to this roll may extend from 50° F. to 150° F. This roll 26 absorbs sufficient heat from the upper surface of the sheet 15 to set the polish on that surface and to allow the sheet to be stripped from the roll 26 by the stripper roll 27.

For the average condition here under consideration, no cooling medium need be circulated through the stripper roll 27, this roll having an average surface temperature of substantially 195° F. Water or oil cooling of the roll 27 may be necessary for heavier gauge sheets, that is, sheets heavier than .080" thick. If cooling of the stripper roll 27 is necessary, water or oil may be circulated therethrough to maintain a proper average surface temperature range of between 180° F. and 210° F.

After the sheet leaves the stripper roll and travels 10 to 20 feet to the cut-off mechanism 42, the sheet has cooled considerably. At the cut-off mechanism 42 the sheet feels warm to the hand but not too hot to handle bare handed.

The foregoing comparisons of temperatures are for the particular type of thermoplastic organic synthetic plastic material specified and for the thickness and width of the sheet specified. For other types of plastic materials and for other thicknesses and widths different specific temperature values will be required but the relationships between the temperature values will remain substantially the same.

Fig. 1-A shows an arrangement wherein the horizontal rolls 25, 26 and 27 are horizontally stacked as distinguished from the vertical stacking as illustrated in Fig. 1. The manner of operation of the arrangement of Fig. 1-A is substantially the same as that of Fig. 1 and a further detailed description is not considered necessary. In the arrangement of Fig. 1-A, the underside of the sheet 15 contacts an appreciable portion of the surface of the roll 25 and accordingly the roll 25 may have a greater cooling effect upon that surface than is the case in Fig. 1. Thus, the roll 25 in Fig. 1–A may assume a greater portion of the cooling load and thereby decrease the cooling load of the cooling mechanism including the pipes 17 and plate 19.

Fig. 3 illustrates an arrangement for also polishing the other side of the sheet 15. Here the stripper roll 27 is provided with a polished surface and radiant heating means 49 are provided for heating that surface of the sheet 15, which would engage the polished stripper roll 27, to a soft and moldable condition. Another roll 50 may be located adjacent the stripper roll 27 for pressing the sheet 15 therebetween. The sheet 15 will be molded into a polished condition by the polished stripper roll 27 and will be cooled thereby, the sheet being stripped from the polished stripper roll 27 by a stripper roll 51. Here the polished stripper roll 27 would be cooled as by circulating cold water therethrough in the same manner as in connection with the polished roll 26. In other words, the same polishing action is applied to each side of the sheet. Fig. 3–A illustrates a portion of the sheet which has been polished on both sides by the arrangement illustrated in Fig. 3.

The details of construction of the apparatus of this invention, as generally shown in Fig. 1, are illustrated with more particularity in Figs. 4 to 13 of the drawings. As shown more clearly in Figs. 4, 9 and 10 the ends of the heat conducting plate 17 are provided with a plurality of pins 56 for receiving and locating the heat conducting pipes 19 extending along the plate. The ends of the pipes 19 are provided with suitable fittings 57 which in turn are connected to hoses 58 for circulating cold water through the pipes 19. The pipes 19 and plates 17, in addition to acting themselves to cool the bottom surface of the sheet 15, also operate to cool the air beneath the sheet so that the sheet is further cooled by this blanket of cold air.

The details of the heating mechanism, including the radiant heating devices 20, are shown more specifically in Figs. 4, 5, 11, 12 and 13. Here the radiant heating devices 20 are secured at their ends by screws 60 to the ends of rods 61. The rods 61 extend upwardly through angle members 64 and are provided with collars 62 and thumb screws 63 for adjustably mounting the rods 61 in the angle members 64. By manipulating the thumb screws 63, the radiant heating devices 20 may be lowered and raised with respect to the upper surface of the sheet 15 to provide the proper amount of radiant heating thereof. The ends of the angle members 64 are adjustably secured by bolts 65 extending through slots 66 in the angle members 28. By reason of these bolts and slots, the angle members 64 may be adjusted forwardly and rearwardly along the angle members 28 so as to position the radiant heating devices 20 forwardly and rearwardly with respect to the extrusion die 14 and the pair of rolls 25 and 26. Thus, complete adjustment of the heating devices is provided.

Secured to the ends of the angle members 28, as by means of welding, are a pair of levers 67. Bolts 68 extending through the members 67 and 28 and through a spacer 69 pivotally mount the members 28 and 67 on the uprights 23 of the apparatus. One end of a spring 70 is connected to each member 67 and the other end of each spring is connected to a member 71 secured to the uprights 23 by screws 72. The springs 70 therefore act as a counterbalancing means for the heating units 20 so that the heating units may be swung into and out of place with the greatest amount of ease. The members 29 are secured to the ends of the members 28 by bolts 74, spacers 75 and nuts 76. Secured to the top of the uprights 23, by means of bolts 78, are a pair of arms 77 which in turn carry pins 79. These pins 79 are adapted to receive one of a plurality of notches 80 in the members 29. In this way, the members 28 and the radiant heating devices 20 may be swung upwardly and latched into any desired position.

Referring now more particularly to Figs. 6, 7 and 8, the details of construction of the rolls 25, 26 and 27 are illustrated. For example, the cylindrical roll 26 has a cylindrical shell whose outer surface is highly polished. The shell 26 is carried by and welded to a pair of annular members 82 which in turn are secured to and carry a pair of shaft members 83. The shaft members 83 are centrally provided with bores 84 which communicate inside of the roll with radial bores 85. The shaft members 83 operate to journal the roll 26 for rotation in the uprights 23 and are provided at their ends with screw threaded extensions 86. One of the shaft portions 83 is provided with a portion 87 for receiving a gear as will be pointed out more fully hereafter. The rolls 25 and 27 are constructed in the same manner as the roll 26. A cooling medium may be circulated through the rolls by means of the bores 84 and 85.

Referring now more particularly to Figs. 4 and 6, the shaft portions of the roll 25 are journaled in bearings 89 which are received in slots 90 in the uprights 23. The shaft portions of the roll 26 are journalled for rotation in bearing members 91 which are received in slots 92 in the uprights 23. Springs 93 engage each bearing member 91 for resiliently urging the roll 26 toward the roll 25, these springs 93 being backed by blocks 94 slidable in the slots 92. A pair of screws 95 engage the blocks 94 and are carried by brackets 96 secured to the uprights 23 by screws 97. By adjusting the screws 95 the tension of the springs 93 may be adjusted for regulating the resilient force moving the roll 26 toward the roll 25. In this way, the sizing of the sheet 15 as to thickness may be regulated. While the top roll 26 has been shown to be adjustable with respect to the bottom roll 25, the reverse situation could equally as well be utilized wherein the bottom roll is adjustable with respect to the top roll. All that is necessary, is that there be a relative adjustment of the two rolls.

The shaft portions of the stripper roll 27 are provided with general bearings 99 which are slidably received in slots 98 in the uprights 23. Screws 100 extend upwardly from the bearings 99 through a screw threaded bracket 101 suitably secured to the uprights 23 and are provided at their upper ends with hand wheels 102. By rotating the hand wheels 102 the stripper roll 27 may be raised and lowered.

One of the shaft portions of each of the rolls 25, 26 and 27 have gears 104, 105 and 106, respectively, secured thereto for the purpose of rotating the rolls. The gears 104, 105 and 106 mesh with worms 107, 108 and 109, respectively, carried by a vertical shaft 110 suitably journalled for rotation on one of the uprights 23. The lower end of the shaft 110 is provided with a gear 111 which is engaged by a worm 112 carried by a shaft 113 which is journalled for rotation on the frame 22. The outer end of shaft 113 carries a sprocket wheel 114 which is connected by a chain 115 to a sprocket wheel 116 driven by a variable speed driving mechanism 117 carried by the frame 22. When the mechanism 117 is operated, the rolls 25, 26 and 27 are power driven in the appropriate directions and the speed of rotation thereof is determined by the adjustment of the drive mechanism 117. The rolls are driven at a linear speed which is substantially the same as the rate of linear extrusion of the sheet from the die 14.

As shown in Fig. 6, the left hand shaft portion of the roll 26 is provided with a fitting 120 which in turn is connected by a hose 121 and valve 122 to a source of cold water. The other shaft portion of the roll 26 is connected by a fitting 123 and a hose 124 for discharging water from the roll 26. In this way, water is circulated through the roll 26 for cooling the same and the rate of flow of the water may be regulated by the valve 122. In a like manner, the left shaft portion of the roll 25 is provided with a fitting 125 and valve 126 connected by a hose 127 to a source of hot oil. The other shaft portion of the roll 25 is connected by a fitting 128 and a hose 129 for discharging oil from the roll 25. In this way, hot oil is circulated through the roll 25 for cooling the same. The desired amount and the rate of flow may be regulated by the valve 126. The left hand shaft portion of the stripper roll 27 may be provided with a fitting 130 connected to a hose 121 and the right hand shaft portion thereof may be connected by a fitting 132 to a hose 133. These hoses and fittings may be utilized for circulating a cooling fluid through the stripper roll 27 if this is required.

The radiant heating device 31 utilized for annealing the sheet as it emerges from the stripper roll 27 may be secured at its ends to a pair of rods 135 carried in brackets 32 secured to the uprights 23. The rods may be adjustably secured to the brackets 32 in the same manner as the rods 61 of the radiant heaters 20 so that the radiant heater 31 may be adjusted upwardly and downwardly with respect to the sheet 15 for regulating the amount of heating and annealing of the sheet thereby.

The pulling roll 37 is suitably journalled in bearings 137 carried by the frame 35. The other pulling roll 38 may be journalled in bearings 138 carried by levers 139 pivoted to the frame 35 at 140. A pair of screws 141 operate to position the pulling roll 38 with respect to the pulling roll 37 so as to maintain a tight grip upon the sheet 15. The shaft carrying the pulling roll 37 is provided with a sprocket wheel 142 which is connected by a chain 143 to a sprocket wheel 144 which is driven by a variable speed driving device 145. When the device 145 is operated, the pulling rolls 37 and 38 are driven to pull the sheet 15. The pulling rolls 37 and 38 are driven at a linear speed corresponding substantially to the linear rate of extrusion of the sheet by the extrusion die 14 and to a linear speed of the rolls 25, 26 and 27. In this way, proper tension is maintained in the sheet 15.

The air pipes 33 which may be utilized for assisting in the cooling of the sheet 15 after it has left the stripper roll 27 may be secured in place on the supporting members 24 by suitable clamping devices 147.

While for purposes of illustration, one form of this invention has been disclosed, other forms thereof may become apparent to those skilled in the art upon reference to this disclosure and therefore this invention is to be limited only by the scope of the appended claims.

I claim as my invention:

1. In a method of continuously producing a thermoplastic organic synthetic plastic sheet having a polished surface, the steps which include continuously extrusion molding a soft sheet of thermoplastic organic synthetic plastic and advancing the same, cooling one surface of said advancing soft sheet sufficiently to cause the same to be self supporting and form retaining to act as a conveyor for said sheet, heating the other surface of said advancing soft sheet sufficiently to render said surface moldable, passing said advancing sheet between a pair of cylindrical rolls, one of which is cooled and provided with a polished surface, to be pressed therebetween and contacting an appreciable portion of the polished surface of said cooled roll with said moldable surface of the advancing sheet for polishing the same and cooling the same sufficiently to enable the sheet to be stripped from the polished surface of said cooled roll.

2. In a method of continuously producing a thermoplastic organic synthetic plastic sheet having a polished surface, the steps which include continuously extrusion molding substantially horizontally a soft sheet of thermoplastic organic synthetic plastic and advancing the same, cooling the lower surface of said advancing soft sheet sufficiently to cause the same to be self supporting and form retaining to act as a conveyor for said sheet, heating the upper surface of said advancing soft sheet sufficiently to render said surface moldable, passing said advancing sheet between a pair of horizontal cylindrical rolls, one of which is cooled and provided with a polished surface, to be pressed therebetween and contacting an appreciable portion of said polished surface of the cooled roll with the moldable upper surface of the advancing sheet for polishing the same and cooling the same sufficiently to enable the sheet to be stripped from the polished surface of said cooled roll.

3. In a method of continuously producing a thermoplastic organic synthetic plastic sheet having a polished surface, the steps which include continuously extrusion molding a soft sheet of thermoplastic organic synthetic plastic and advancing the same, applying a cold blanket of air to one of the surfaces of said advancing soft sheet for cooling the same sufficiently to cause the same to be self supporting and form retaining to act as a conveyor for said sheet, heating the other surface of said advancing soft sheet sufficiently to render said surface moldable, passing said advancing sheet between a pair of cylindrical rolls, one of which is cooled and provided with a polished surface, to be pressed therebetween and contacting an appreciable portion of the polished surface of said cooled roll with said moldable surface of the advancing sheet for polishing the same and cooling the same sufficiently to enable the sheet to be stripped from the polished surface of said cooled roll.

4. In a method of continuously producing a thermoplastic organic synthetic plastic sheet having a polished surface, the steps which include continuously extrusion molding a soft sheet of thermoplastic organic synthetic plastic and advancing the same, cooling one surface of said advancing soft sheet sufficiently to cause the same to be self supporting and form retaining to act as a conveyor for said sheet, applying radiant heat to the other surface of said advancing soft sheet to heat the same sufficiently to render said surface moldable, passing said advancing sheet between a pair of cylindrical rolls, one of which is cooled and provided with a polished surface, to be pressed therebetween and contacting an appreciable portion of the polished surface of said cooled roll with said moldable surface of the advancing sheet for polishing the same and cooling the same sufficiently to enable the sheet to be stripped from the polished surface of said cooled roll.

5. In a method of continuously providing a thermoplastic organic synthetic plastic sheet having a polished surface, the steps which include continuously extrusion molding a soft sheet of thermoplastic organic synthetic plastic and advancing the same, applying a cold blanket of air to one of the surfaces of said advancing soft sheet for cooling the same sufficiently to cause the same to be self supporting and form retaining to act as a conveyor for said sheet, applying radiant heat to the other surface of said advancing soft sheet to heat the same sufficiently to render said surface moldable, passing said advancing sheet between a pair of cylindrical rolls, one of which is cooled and provided with a polished surface, to be pressed therebetween and contacting an appreciable portion of the polished surface of said cooled roll with said moldable surface of the advancing sheet for polishing the same and cooling the same sufficiently to enable the sheet to be stripped from the polished surface of said cooled roll.

6. In a method of continuously producing a thermoplastic organic synthetic plastic sheet having a polished surface, the steps which include continuously extrusion molding a soft sheet of thermoplastic organic synthetic plastic and advancing the same, passing said advancing sheet between a pair of cylindrical rolls, one of which is provided with a polished surface, to be pressed thereby and contacting said sheet with an appreciable portion of the roll having the polished surface, and progressively cooling said advancing sheet in controlled fashion by first cooling one surface of said soft sheet sufficiently to cause the same to be self supporting and form retaining to act as a conveyor for said sheet, prior to contact with the cylindrical rolls, while maintaining the other surface of said sheet, which engages the roll with the polished surface, sufficiently soft so as to be in moldable condition and be polished by the roll having the polished surface, and then cooling said other surface of the sheet as it is being polished by the polished roll surface so that it may be stripped from the roll with the polished surface.

7. In a continuous method of polishing a surface of a thermoplastic organic synthetic plastic sheet, the steps which include continuously advancing a thermoplastic organic synthetic plastic sheet, heating a surface of said advancing sheet sufficiently to soften said surface to a moldable condition while maintaining the other surface of the sheet self supporting and form retaining to act as a conveyor for the sheet, passing said advancing sheet between a pair of cylindrical rolls, one of which is cooled and provided with a polished surface, to be pressed therebetween and contacting an appreciable portion of the polished surface of said cooled roll with said softened moldable surface of the advancing sheet for polishing the same and cooling the same sufficiently to enable the sheet to be stripped from the polished surface of said cooled roll.

8. In a continuous method of polishing a surface of a thermoplastic organic synthetic plastic sheet, the steps which include continuously advancing a thermoplastic organic synthetic plastic sheet, applying radiant heat to one of the surfaces of said advancing sheet sufficiently to soften said surface to a moldable condition while maintaining the other surface of the sheet self supporting and form retaining to act as a conveyor for the sheet, passing said advancing sheet between a pair of cylindrical rolls, one of which is cooled and provided with a polished surface, to be pressed therebetween and contacting an appreciable portion of the polished surface of said cooled roll with said softened moldable surface of the advancing sheet for polishing the same and cooling the same sufficiently to enable the sheet to be stripped from the polished surface of said cooled roll.

9. In a continuous method of polishing a surface of a thermoplastic organic synthetic plastic sheet, the steps which include continuously advancing in a substantially horizontal plane a thermoplastic organic synthetic plastic sheet, heating the upper surface of said advancing sheet sufficiently to soften said surface to a moldable condition while maintaining the lower surface of the sheet self supporting and form retaining to act as a conveyor for the sheet, passing said advancing sheet between a pair of horizontal cylindrical rolls, one of which is cooled and provided with a polished surface, to be pressed therebetween and contacting an appreciable portion of said polished surface of the cooled roll with the softened moldable upper surface of the advancing sheet for polishing the same and cooling the same sufficiently to enable the sheet to be stripped from the polished surface of said cooled roll.

10. In an apparatus for continuously polishing a surface of an advancing thermoplastic organic synthetic plastic sheet, a frame, a pair of closely adjacent cylindrical rolls, the surface of one of which is polished, a cylindrical stripper roll adjacent said roll having the polished surface, means for rotatably mounting the rolls on the frame, the advancing thermoplastic organic synthetic plastic sheet passing between said pair of rolls to be pressed thereby, over a substantial portion of the roll having the polished surface and over the stripper roll, radiant heating means carried by the frame adjacent said roll having the polished surface for heating the surface of the sheet, before it engages the roll having the polished surface, sufficiently to soften the same to a moldable condition while maintaining the other surface of the sheet self supporting and form retaining to act as a conveyor for the sheet, and means for supplying a cooling medium to the roll having the polished surface for polishing the softened moldable surface of the sheet and for cooling the same sufficiently to be stripped therefrom by the stripper roll.

11. In an apparatus for continuously polishing a surface of an advancing thermoplastic organic synthetic plastic sheet, a frame, a pair of closely adjacent cylindrical rolls, the surface of one of which is polished, a cylindrical stripper roll adjacent said roll having the polished surface, means for rotatably mounting the rolls on the frame, the advancing thermoplastic organic synthetic plastic sheet passing between said pair of rolls to be pressed thereby, over a substantial portion of the roll having the polished surface and over the stripper roll, means for adjustably positioning the rolls of said pair of rolls with respect to each other for adjustably sizing the sheet passing therebetween, radiant heating means carried by the frame adjacent said roll having the polished surface for heating the surface of the sheet, before it engages the roll having the polished surface, sufficiently to soften the same to a moldable condition while maintaining the other surface of the sheet self supporting and form retaining to act as a conveyor for the sheet, means for adjusting the radiant heating means to regulate the amount of heating of the surface of the sheet thereby, means for supplying a cooling medium to the roll having the polished surface for polishing the softened moldable surface of the sheet and for cooling the same sufficiently to be stripped therefrom by the stripper roll, and means for regulating the cooling medium supplied to the roll having the polished surface for regulating the amount of cooling thereof.

12. In an apparatus for continuously producing a thermoplastic organic synthetic plastic sheet having a polished surface, an extrusion machine having an extrusion die for continuously extrusion molding substantially horizontally a soft thermoplastic organic synthetic plastic sheet, a cooling mechanism adjacent the extrusion die over which the soft sheet passes for cooling the under surface of the sheet sufficiently to cause the same to be self supporting and form retaining to act as a conveyor for said sheet, a heating mechanism adjacent the extrusion die under which the soft sheet passes for heating the upper surface of the sheet sufficiently to render the upper surface moldable, a pair of horizontal cylindrical rolls rotatably mounted adjacent the heating and cooling mechanism, one of the rolls having a polished surface, a cylindrical stripper roll rotatably mounted adjacent said pair of rolls, said sheet passing from between the heating and cooling mechanisms between said pair of rolls, over a portion of the roll having the polished surface and over the stripper roll, said sheet being pressed between said pair of rolls and the moldable surface of said sheet being polished by the roll having the polished surface and cooled thereby sufficiently to be stripped therefrom by the stripper roll.

13. In an apparatus for continuously producing a thermoplastic organic synthetic plastic sheet having a polished surface, an extrusion machine having an extrusion die for continuously extrusion molding substantially horizontally a soft thermoplastic organic synthetic plastic sheet, a cooling mechanism adjacent the extrusion die over which the soft sheet passes for cooling the under surface of the sheet sufficiently to cause the same to be self supporting and form retaining to act as a conveyor for said sheet, heating mechanism adjacent the extrusion die under which the soft sheet passes for heating the upper surface of the sheet sufficiently to render the upper surface moldable, a pair of horizontal cylindrical rolls rotatably mounted adjacent the heating and cooling mechanism, one of the rolls having a polished surface, a cylindrical stripper roll rotatably mounted adjacent said pair of rolls, said sheet passing from between the heating and cooling mechanisms between said pair of rolls, over a portion of the roll having the polished surface and over the stripper roll, said sheet being pressed between said pair of rolls and the moldable surface of said sheet being polished by the roll having the polished surface and cooled thereby sufficiently to be stripped therefrom by the stripper roll, a pair of pulling rolls, said sheet extending from the stripper roll to the pair of pulling rolls to be pulled thereby, and means for driving said rolls at a linear speed corresponding substantially to the linear extrusion rate of the extrusion machine to maintain a substantially fixed tension in the sheet as it passes through the apparatus.

14. In an apparatus for continuously producing a thermoplastic organic synthetic plastic sheet having a polished surface, an extrusion machine having an extrusion die for continuously extrusion molding substantially horizontally a soft thermoplastic organic synthetic plastic sheet, a cooling mechanism adjacent the extrusion die over which the soft sheet passes for cooling the under surface of the sheet sufficiently to cause the same to be self supporting and form retaining to act as a conveyor for said sheet, a heating mechanism adjacent the extrusion die under which the soft sheet passes for heating the upper surface of the sheet sufficiently to render the upper surface moldable, a pair of horizontal cylindrical rolls rotatably mounted adjacent the heating and cooling mechanisms, one of the rolls having a polished surface, a cylindrical stripper roll rotatably mounted adjacent said pair of rolls, said sheet passing from between the heating and cooling mechanisms between said pair of rolls, over a portion of the roll having the polished surface and over the stripper roll, said sheet being pressed between said pair of rolls and the moldable surface of said sheet being polished by the roll having the polished surface and cooled thereby sufficiently to be stripped therefrom by the stripper roll, a pair or pulling rolls, said sheet extending from the stripper roll, to the pair of pulling rolls to be pulled thereby, means for driving said rolls at a linear speed corresponding substantially to the linear extrusion rate of the extrusion machine to maintain a substantially fixed tension in the sheet as it passes through the apparatus, and cut-off means for severing sections from the end of the advancing sheet.

15. In an apparatus for continuously producing a thermoplastic organic synthetic plastic sheet having a polished surface, an extrusion machine having an extrusion die for continuously extrusion molding substantially horizontally a soft thermoplastic organic synthetic plastic sheet, a cooling mechanism adjacent the extrusion die, including a heat conducting plate and heat conducting pipes having a cooling medium circulating therethrough, over which the soft sheet passes for cooling the under surface of the sheet sufficiently to cause the same to be self supporting and form retaining to act as a conveyor for said sheet, a heating mechanism adjacent the extrusion die under which the soft sheet passes for heating the upper surface of the sheet sufficiently to render the upper surface moldable, a pair of horizontal cylindrical rolls rotatably mounted adjacent the heating and cooling mechanisms, one of the rolls having a polished surface, a cylindrical stripper roll rotatably mounted adjacent said pair of rolls, said sheet passing from between the heating and cooling mechanisms between said pair of rolls, over a portion of the roll having the polished surface and over the stripper roll, said sheet being pressed between said pair of rolls and the moldable surface of said sheet being polished by the roll having the polished surface and cooled thereby sufficiently to be stripped therefrom by the stripper roll.

16. In an apparatus for continuously producing a thermoplastic organic synthetic plastic sheet having a polished surface, an extrusion machine having an extrusion die for continuously extrusion molding substantially horizontally a soft thermoplastic organic synthetic plastic sheet, a cooling mechanism adjacent the extrusion die over which the soft sheet passes for cooling the under surface of the sheet sufficiently to cause the same to be self supporting and form retaining to act as a conveyor for said sheet, a heating mechanism adjacent the extrusion die, including radiant heating means, under which the soft sheet passes for heating the upper surface of the sheet sufficiently to render the upper surface moldable, a pair of horizontal cylindrical rolls rotatably mounted adjacent the heating and cooling mechanisms, one of the rolls having a polished surface, a cylindrical stripper roll rotatably mounted adjacent said pair of rolls, said sheet passing from between the heating and cooling mechanisms between said pair of rolls, over a portion of the roll having the polished surface and over the stripper roll, said sheet being pressed between said pair of rolls and the moldable surface of said sheet being polished by the roll having the polished surface and cooled thereby sufficiently to be stripped therefrom by the stripper roll.

17. In a method of continuously producing a thermoplastic organic synthetic plastic sheet having a polished surface, the steps which include continuously extrusion molding a soft sheet of thermoplastic organic synthetic plastic and advancing the same, changing the relative temperatures of the opposite surfaces of said advancing sheet whereby one surface will be made self supporting and form retaining to act as a conveyor for said sheet and whereby the other surface will be rendered moldable, passing said advancing sheet between a pair of cylindrical rolls, one of which is cooled and provided with a polished surface, to be pressed therebetween and contacting an appreciable portion of the polished surface of said cooled roll with said moldable surface of the advancing sheet for polishing the same and cooling the same sufficiently to enable the sheet to be stripped from the polished surface of said cooled roll.

18. In a continuous method of polishing a surface of a thermoplastic organic synthetic plastic sheet, the steps which include continuously advancing a thermoplastic organic synthetic plastic sheet, producing differential temperatures between the opposite surfaces of the sheet to cause the cooler one of the surfaces to present a hard backing for the sheet and to cause the hotter one of the surfaces to soften to a moldable condition, passing said advancing sheet between a pair of cylindrical rolls, one of which is cooled and provided with a polished surface, with an appreciable portion of the polished surface of the cooled roll being contacted by the softened moldable surface of the advancing sheet, whereby pressure is applied through the soft moldable surface of the sheet to densify and size the sheet and polish the soft moldable surface of the sheet and cool the same sufficiently to enable the sheet to be stripped from the polished surface of the cooled roll.

References Cited in the file of this patent
UNITED STATES PATENTS

| | | |
|---|---|---|
| 2,551,005 | Johnson | May 1, 1951 |
| 2,551,966 | Pierce | May 8, 1951 |
| 2,574,588 | Piperoux et al. | Nov. 13, 1951 |